Dec. 30, 1952     C. O. JORGENSEN     2,624,039
DIRECT CURRENT REGULATED POWER SUPPLY
Filed April 23, 1951
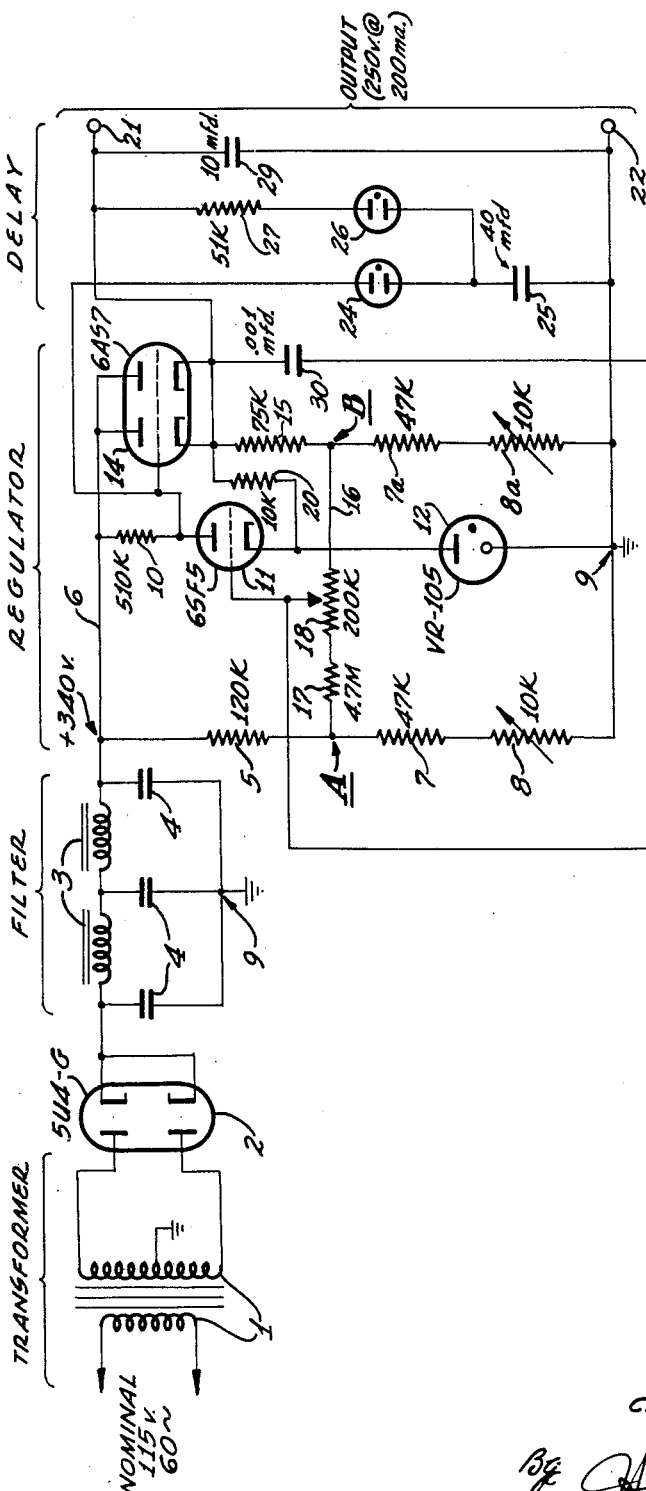
INVENTOR:
CLINTON O. JORGENSEN
HIS PATENT ATTORNEY Patented Dec. 30, 1952

2,624,039

UNITED STATES PATENT OFFICE 2,624,039

DIRECT CURRENT REGULATED POWER SUPPLY

Clinton O. Jorgensen, Gardena, Calif., assignor to Northrop Aircraft, Inc., Hawthorne, Calif., a corporation of California Application April 23, 1951, Serial No. 222,394

9 Claims. (Cl. 323—22)

This invention relates to voltage regulators, and, more particularly, to a regulated D. C. power supply giving a more accurately regulated output voltage than is possible with devices presently known.

In conventional vacuum-tube voltage regulators, no matter how refined, a small discrepancy in output voltage is necessary if the regulator is to function. This is to be expected since no vacuum tube has infinite amplification. It is an object of the present invention to provide a voltage regulator wherein a certain error in output voltage is not depended upon for control of the regulator, so that such a regulator is free of the inherent small error of previous devices.

Electrical equipment to be operated under field conditions, where there is no stable electric power available, is often operated from motor-generator sets which offer a fluctuating voltage source. Certain types of electronic apparatus, such as some radar equipment circuits for example, require a very stable voltage supply at a fixed load. Therefore, it is another, more specific object of this invention to provide a regulated D. C. power supply wherein the output voltage remains constant within less than 0.1% over an appreciable range of input voltage variations, both of the slow change type and transient or ripple types.

In using vacuum tubes of high current-carrying capacity as regulator tubes in voltage regulators, the cathode must be given a certain warm-up period before full load current is applied if normal life expectancy of the tube is to be obtained. For this reason, it is common to provide a separate switch or switches so that the filament or heater supply can be operated alone before the load circuit is switched on. Another object of the invention is to provide means in a voltage regulator whereby the application of load current is automatically delayed after turning on the whole power supply at once, this delay extending over a sufficient period of time (20 seconds, for example) to allow substantially complete cathode warm-up in the regulator tubes.

Other objects and advantages of the present invention will be noted as this specification continues.

Briefly, my invention comprises a regulator circuit having a control tube which varies the D. C. plate resistance of a regulator tube in accordance with signals directly from both the input voltage and the output voltage, so that input voltage variations are anticipated and corrected in time to exactly counteract the tendency of the output voltage to change. In this manner, "zero regulation" is achieved. The term "zero regulation," as used herein, refers to the condition wherein the output voltage change is zero with changes in the input voltage or load current. Adjustment is provided to compensate for control tube amplification so that this zero regulation can be obtained over certain actual input voltage ranges.

The grid of the regulator tube is connected to an RC circuit containing a neon glow lamp which fires during the initial warm-up period to lower the grid potential and thus prevent maximum tube conduction. Additional automatic means are provided to make this first neon lamp inoperative after the warm-up period, so that the regulator control circuit is not thereafter disturbed by reason of condenser leakage.

My invention will be more clearly understood by reference to the following detailed description and the accompanying drawing which is a schematic diagram of a power supply with a regulator embodying the principles of the present invention connected therein, part values being for illustration of one preferred apparatus only.

Referring to the drawing, a conventional rectifier and filter is provided, consisting of a power transformer 1, 5U4-G rectifier tube 2, two filter chokes 3, and three filter condensers 4. Connected across the filter output is the regulator and delay circuit, from which the output terminals are connected.

The regulator first comprises a bleeder section of a 120,000 ohm resistor 5 connected to a positive filter output wire 6, a 47,000 ohm series resistor 7 and a 10,000 ohm variable resistance 8 connected to ground 9, which is also the negative side of the filter. Next shown is a control circuit comprising a 510,000 ohm control resistor 10 connected to the filter output wire 6, a 6SF5 control tube 11 with its plate connected to the control resistor 10, and a VR-105 voltage regulator tube 12 with its plate connected to the cathode of the control tube 11, and with its cathode grounded. Following this is a regulator circuit comprising a 6AS7 regulator tube 14 with both plates connected to the filter output wire 6, and a voltage divider of a 75,000 ohm resistor 15 connected to both cathodes of the regulator tube 14, a 47,000 ohm series resistor 7a, and a 10,000 ohm variable resistance 8a connected to ground.

A high resistance branch 16 containing a 4.7 megohm resistor 17 and a 200,000 ohm potentiometer 18 is connected at one end to the bleeder section between resistors 5 and 7, and at the other end to the voltage divider between resistors 15 and 7a. The movable element of the potentiometer 18 is connected to the grid of the control tube 11. A 10,000 ohm resistor 20 is connected between the plate of the VR tube 12 and the cathodes of the regulator tube 14. A positive regulator output terminal 21 is connected to the cathodes of the regulator tube 14, and a negative regulator output terminal 22 is grounded. The plate of the control tube 11 is connected directly to both grids of the regulator tube 14.

The variable resistances 8 and 8a are for the purpose of adjusting the output voltage to the necessary value, by increasing or decreasing them both. In the embodiment illustrated, 250 volts was required at the load and the filter output voltage on wire 6 was 340. The variable resistances 8 and 8a are also differentially adjusted to cause no current flow in the branch 16. In other words, the end points A and B of this branch are at the same potential, for a given input voltage.

In operation, if the load should increase, for example, the current through resistors 15 and 7a and variable resistance 8a decreases a small amount and this causes a less positive voltage at point B and hence on the grid of the control tube 11. A lower current through this tube 11 and through the control resistor 10 results, so that a more positive voltage occurs on the grid of the regulator tube 14. This action lowers the D. C. plate resistance of the regulator tube 14, and thus causes a higher proportion of the total filter output voltage to appear across the voltage divider resistors 15 and 7a and variable resistance 8a, and therefore across the output terminals 21 and 22. This rise of voltage across the divider resistors, as a result of regulator action, practically cancels the tendency of the output voltage to drop when the load was increased. In this respect, the present invention works like the conventional regulator and gives equal or better results. A decrease in load current causes regulator action just in the reverse of that described above.

If the filter output voltage should drop, for example, an instantaneous drop appears at point A to lower the grid voltage of the control tube 11 and act to raise the regulator output voltage as described above, which counteracts the natural tendency to fall as a result of input voltage drop. When the potentiometer 18 is correctly set, the output voltage will remain at 250 volts exactly, with the lowered input voltage. It will be noted that this is different from the well-known regulator action which requires a change, however small, in output voltage before the regulator functions. With this invention, the input voltage change is immediately put to work to anticipate the output voltage change and correct for it, as well as functioning in the normal manner when the load fluctuates. Thus, the present voltage regulator is responsive to variations both in the input and output voltage, and this double action results in improved regulation over devices having but a single error-signal source.

Improper potentiometer setting could give over-regulation as well as under-regulation. What this adjustment actually does is vary the percentage of error voltage applied at the control tube to give the desired amount of regulation.

The VR tube 12 provides a stable voltage level for the control tube 11, as is usually done. The 10,000 ohm resistor 20 is necessary to fire the VR tube, and provides a path for most of its current, which could not be carried by the low-current, high-gain control tube 11.

As mentioned in the introduction, full load current should not be applied through the regulator tube 14 until its cathode has been heated for about 15 or 20 seconds. To allow delayed application of load when the equipment is first turned on, the following delay provisions are made. A first neon bulb 24 is connected to the negative end of the control resistor 10 and to one side of a 40 mfd. condenser 25 which is grounded at the other side. A second neon bulb 26 is also connected to the positive side of the 40 mfd. condenser 25 and to a 51,000 ohm protective resistor 27 which is connected to the output terminal 21.

The delay operation is explained briefly as follows: When the whole circuit is energized by applying line voltage to the transformer 1, and the filter output voltage rises toward 340 volts, the first neon bulb 24 fires when about 90 volts occurs across it, as obtained from the lower end of the control resistor 10. As the first bulb 24 conducts, it charges the 40 mfd. condenser 25 through the control resistor 10. The grid of the regulator tube 14 is given a more negative potential by this charging current so that conduction of the regulator tube is definitely restricted. There is a 20-second time constant through this charging path, and the regulator grid is gradually increased in potential as the charging continues and as the regulator tube cathode heats.

After the output voltage is about two-thirds of its rated value, the VR tube 12 and the control tube 11 begin to conduct, extinguishing the first neon bulb 24 for five or six seconds. The grid of the regulator tube 14 is still not up to its steady value, however, since the input voltage is still rising. When the circuit is nearly fully operating, both neon bulbs 24 and 26 fire, which again slows down the rise of output voltage at the regulator tube 14 cathode until the 40 mfd. condenser 25 is fully charged. At this time, both neon bulbs are extinguished, the regulator output voltage is at design value, and the regulator is under normal control, with the regulator tube 14 allowed to pass full load current.

The regulator tube 14 in this embodiment operates under a normal grid bias of about 36 volts, which places 36 volts more across the second neon bulb 26 than across the first neon bulb 24. Therefore, the second bulb will always fire first to recharge the 40 mfd. condenser 25 after normal leakage. It is thus seen that the first bulb 24 will not be fired again during continued operation, which would upset the control circuit by increasing the bias on the regulator tube 14.

A 10 mfd. condenser 29 is connected across the output terminals 21 and 22 to absorb any pulses generated in the load. As a further precaution against these possible pulses or spurious A. C. transients in the load, a .001 mfd. coupling condenser 30 is connected between the positive output terminal 21 and the grid of the control tube 11. Thus, a strong positive pulse, for example, which is not completely shorted out by the 10 mfd. condenser 29, will be applied to the control tube 11 grid to increase the effective D. C. resistance of the regulator tube 14 to maintain constant current through the load and voltage divider, and thereby tend to reduce the output voltage in an amount cancelling the original positive pulse. In other words, the regulator presents very low impedance to any pulses in the load.

It is thus evident that an extremely good regulation is achieved by the present invention for input voltage variations. Besides compensating for slow changes in input voltage, it is equally sensitive to ripple voltages and fast transient changes, since they are detected immediately at the control tube 11 grid. As a test, 30 to 35 volts of 60-cycle A. C. was introduced in the filter output wire 6, and the resulting ripple was barely noticeable at the output terminals 21 and 22 using full gain on a high-gain oscilloscope.

The potentiometer 18 is easily set to the proper position for any reasonable fluctuation expected in the supply line voltage. First the regulator is operated at average line voltage until the variable resistances 8 and 8a are adjusted as described before. Then the line voltage is changed (by means of a variable autotransformer, for example) to an extreme value anticipated for service conditions of the regulator. The potentiometer 18 is then positioned so that the correct regulator output voltage is again provided, the same as before the line voltage was changed. This setting should be checked by setting the line voltage to the opposite extreme and checking the output voltage. This condition now represents "zero regulation," as defined hereinbefore. In calculating the regulation of the embodiment shown herein by varying the A. C. line voltage through all values between 100 and 135 volts, with an output of 250 volts and 200 milliamperes of load, I measured an output voltage change of less than one-fourth volt, which is less than 0.1% of full rated output voltage.

This regulator is best suited for use with a given voltage output at a substantially fixed load current, so that the same precision regulation can be obtained for equal excursions of the input voltage on either side of normal, as is usually the object in such devices. For a widely different required regulator output voltage, the filter output voltage should be modified so that optimum operation of the regulator will be insured.

Another advantage of this regulator over some other special types is that it allows the negative side (ground) of the power supply filter and regulator to be the same as that of the connected load.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In a D. C. voltage regulator, a regulator tube and a voltage divider in series across the input circuit to said regulator, output connections across said voltage divider, a control tube for automatically varying the bias on said regulator tube in accordance with signals applied to said control tube, a bleeder resistance section also connected across said input circuit, a high resistance branch connected between a point on said bleeder section and a point on said voltage divider, and signal pick-off means connected from said high resistance branch to said control tube in proper phase to decrease the D. C. plate resistance of said regulator tube and therefore increase the ratio of output voltage at said output connections to total regulator input voltage when either said input voltage or said output voltage lowers, and vice versa, said pick-off means being adjustable to regulate the strength of said signals whereby zero regulation is obtained with substantial input voltage changes in either direction.

2. Apparatus in accordance with claim 1 wherein said voltage divider and said bleeder section each contain an independent variable resistance member, and said high resistance branch is connected to points having equal potential when the regulator input and output voltages are each at normal design value.

3. Apparatus in accordance with claim 1 wherein said signal pick-off means includes a potentiometer having the fixed ends thereof connected in series in said high resistance branch, and means connecting the movable contact of said potentiometer to a grid of said control tube.

4. Apparatus in accordance with claim 1 including a filter capacitor connected across said output connections, and a coupling capacitor connected from one of said output connections to said control tube in proper phase to cancel from said output connections any voltage pulses or other voltage waveforms generated in the load to be supplied by said regulator.

5. In a D. C. voltage regulator having a current regulator tube in series with the load to be supplied by said regulator, said regulator tube having a control grid and a cathode, means for preventing full-load current from passing through said regulator tube during initial heating of said cathode, which comprises a series RC circuit connected across a high voltage circuit of said regulator, a glow discharge lamp in said RC circuit, and means connecting said control grid to a point in said RC circuit below the negative end of a control resistance therein.

6. In a D. C. voltage regulator having a current regulator tube in series with the load to be supplied by said regulator, said regulator tube having a control grid and a cathode, means for preventing full-load current from passing through said regulator tube during initial heating of said cathode, which comprises a time delay control resistor connected to a normally high voltage point of said regulator, a glow discharge lamp and a time delay control capacitor connected in series between said control resistor and a low voltage point of said regulator, and means connecting said control grid to the negative end of said control resistor.

7. Apparatus in accordance with claim 6 wherein said glow discharge lamp is connected to said delay control resistor, and said delay control capacitor is connected between said glow lamp and said low voltage point, and including a second glow discharge lamp connected between the positive side of said control capacitor and a source of potential substantially higher than the normal operating potential of the positive side of the first glow lamp, whereby leakage of said delay control capacitor during continued operation will cause firing of said second glow lamp, and consequent capacitor recharging, rather than firing of said first glow lamp.

8. In a D. C. voltage regulator having a current regulator tube in series with the load to be supplied by said regulator, said regulator tube having a control grid, and a control tube for automatically varying the bias on said regulator tube, said control tube having an anode, the combination of a control resistor connected from said anode to a normally high voltage point of said regulator, means connecting said anode with said regulator tube control grid, a glow discharge lamp having one side connected to said anode, a delay capacitor connected between the other side of said glow lamp and a low voltage point of said regulator, said control resistor, glow lamp, and delay capacitor forming an RC circuit having a time constant of about 20 seconds, whereby the grid voltage of said regulator tube is normally controlled by anode current of said control tube and whereby said control grid is given a substantially low voltage during initial warm-up of said regulator to protect said regulator tube.

9. Apparatus in accordance with claim 8 including a second glow discharge lamp connected between the positive side of said delay capacitor and a source of potential substantially higher than the normal operating potential of the positive side of the first glow lamp, whereby leakage of said delay capacitor during continued operation will cause firing of said second glow lamp, and consequent capacitor recharging, rather than firing of said first glow lamp.

CLINTON O. JORGENSEN.

REFERENCES CITED

The following references are of record in the file of this patent:

UNITED STATES PATENTS

| Number | Name | Date |
| --- | --- | --- |
| 2,210,393 | Braden | Aug. 6, 1940 |
| 2,268,790 | White et al. | Jan. 6, 1942 |
| 2,377,500 | Johnson | June 5, 1945 |
| 2,419,496 | Lord | Apr. 22, 1947 |
| 2,474,269 | Martinez | June 28, 1949 |
| 2,528,569 | Young et al. | Nov. 7, 1950 |

FOREIGN PATENTS

| Number | Country | Date |
| --- | --- | --- |
| 472,326 | Great Britain | Sept. 22, 1937 |